US006928365B2

(12) United States Patent     (10) Patent No.:     US 6,928,365 B2
Sakai                                          (45) Date of Patent:     Aug. 9, 2005

(54) NAVIGATION APPARATUS, NAVIGATION METHOD, NAVIGATION PROGRAM AND RECORDING MEDIUM STORING THE PROGRAM

(75) Inventor: Akira Sakai, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 53 days.

(21) Appl. No.: 10/409,602

(22) Filed: Apr. 9, 2003

(65) Prior Publication Data

US 2003/0216858 A1 Nov. 20, 2003

(30) Foreign Application Priority Data

Apr. 9, 2002 (JP) ...................................... 2002-106358

(51) Int. Cl.$^7$ .............................................. G01C 21/34
(52) U.S. Cl. ..................... 701/211; 701/209; 340/995.2
(58) Field of Search ................................ 701/209, 210, 701/211; 340/995.19, 995.2, 995.21

(56) References Cited

U.S. PATENT DOCUMENTS

| 6,347,280 | B1 | | 2/2002 | Inoue et al. | ................. | 701/211 |
|---|---|---|---|---|---|---|
| 6,424,911 | B2 | * | 7/2002 | Yamashita et al. | .......... | 701/208 |
| 6,446,000 | B2 | * | 9/2002 | Shimabara | ................... | 701/209 |
| 6,760,662 | B2 | * | 7/2004 | Lee | ............................. | 701/211 |
| 2001/0012981 | A1 | * | 8/2001 | Yamashite et al. | .......... | 701/211 |
| 2001/0027377 | A1 | * | 10/2001 | Shimabara | ................... | 701/209 |
| 2001/0037176 | A1 | | 11/2001 | Mikame | ...................... | 701/211 |
| 2002/0032523 | A1 | | 3/2002 | Sakashita | .................... | 701/211 |
| 2002/0165667 | A1 | * | 11/2002 | Lee | ............................. | 701/211 |

FOREIGN PATENT DOCUMENTS

EP  0 877 348 A2  11/1998

OTHER PUBLICATIONS

European Search Report dated Nov. 20, 2003.
Patent Abstracts of Japan; vol. 2000, No. 02, Feb. 29, 2000 & JP 11 311535 A (AISIN AW Co Ltd), Nov. 9, 1999 *abstract*.

* cited by examiner

Primary Examiner—Gary Chin
(74) Attorney, Agent, or Firm—Armstrong, Kratz, Quintos, Hanson & Brooks, LLP (57) ABSTRACT

A navigation apparatus defines the route of movement from the current location to the destination on the basis of map information. It acquires road information relating to characteristics of the current road on which the vehicle is running and those of each of the branch roads extending from the fork located ahead of the current road by way of road information acquiring section 21. The acquired road information is collated with the requirement information stored in requirement information storage section 22 and the number of points correlated with the requirement that is met or not met are added or subtracted, whichever appropriate, to determine the total number of points by the agreement judging section 23. If the total number of points is greater than a threshold value, the navigation apparatus judges that the vehicle may not divert from the route of movement and restricts or suppresses guidance for driving the vehicle provided by guidance notification section 18. If, on the other hand, the total number of points is smaller than the threshold value, the navigation apparatus judges that the vehicle may divert from the route of movement and allows the guidance notification section 18 to provide guidance.

16 Claims, 7 Drawing Sheets

NAVIGATION APPARATUS, NAVIGATION METHOD, NAVIGATION PROGRAM AND RECORDING MEDIUM STORING THE PROGRAM

BACKGROUND OF THE INVENTION

1. Field of the Invention

This invention relates to a navigation apparatus, a navigation method, a navigation program and a recording medium storing the program.

2. Description of Related Art

Navigation apparatus for supporting the user driving a motor vehicle by providing guidance for the moving vehicle until the vehicle gets to the destination have been developed in recent years and are well known at present. With such a navigation apparatus, the route to be followed by the passenger to get to the destination is defined automatically and the passenger is guided by voice and display so as to move along the defined route.

As the passenger is guided to move on, the vehicle may come across a fork where a number of roads are found ahead. Then, the navigation apparatus indicates the way to be taken by the passenger in order to follow the defined route so that the moving vehicle may not divert from the defined route to be followed.

When the moving vehicle comes across a fork, the passenger may not miss the defined route without guidance if the current road continues beyond the fork and appears to be the right way to be taken. Then, the passenger can drive the vehicle without diverting from the defined route. In such a case, the voice guiding the passenger may sound unnecessary and unpleasant. Particularly, when the passenger is playing the car audio system and enjoying music, he or she may be embarrassed by the voice guidance because it interferes with the pleasure of listening to music.

SUMMARY OF THE INVENTION

The major object of the present invention is to provide a navigation apparatus, a navigation method, a navigation program and a recording medium storing the navigation program that highly appropriately notifies guidance for driving a motor vehicle.

In an aspect of the invention, the above object is achieved by providing a navigation apparatus comprising: a current location recognizing section for recognizing the current location of a moving vehicle; a destination recognizing section for recognizing the destination of the moving vehicle; a map information storage section for storing map information including road information relating to the locations of forks and the road to be followed by the moving vehicle from each fork to the next; a route of movement defining section for defining the route of movement to be followed by the moving vehicle from the current location recognized by the current location recognizing section to the destination recognized by the destination recognizing section on the basis of the road information in the map information; a guidance notification section for notifying guidance relating to the movement of the moving vehicle on the basis of the route of movement to be followed as defined by the route of movement defining section and the current location recognized by the current location recognizing section; and a guidance notification control section for controlling the notification by the guidance notification section on the basis of the current road bearing the moving vehicle on the route of movement, the road continuing from the fork located immediately ahead of the moving vehicle in the moving direction of the vehicle and road information relating to the roads from the fork other than the one continuing on the route of movement.

Thus, according to the present invention, the route of movement defining section defines the route of movement to be followed by the moving vehicle from the current location recognized by the current location recognizing section to the destination recognized by the destination recognizing section on the basis of road information relating to the locations of forks and the road to be followed by the moving vehicle from each fork to the next in the map information stored in the map information storage section. Then, the guidance notification control section controls the notification of guidance relating to the movement of the moving vehicle by the guidance notification section that is made on the basis of the route of movement and the current location and the control operation of the guidance notification control section is based on road information relating to the current road bearing the moving vehicle on the route of movement, road information relating to the road continuing from the fork located immediately ahead of the moving vehicle in the moving direction of the vehicle and road information relating to the roads other than the one continuing from the fork on the route of movement. Therefore, the road condition of the route of movement that will be found ahead of the moving vehicle in the moving direction of the vehicle is recognized and guidance will be notified appropriately depending on the road condition so that the embarrassment due to unnecessary guidance is avoided and the moving vehicle can continue its movement under an appropriate guidance.

In a navigation apparatus according to the invention, the guidance notification control section preferably controls the notification of the guidance notification section by comparing road information relating to the current road bearing the moving vehicle on the route of movement, road information relating to the road continuing from the fork located immediately ahead of the moving vehicle in the moving direction of the vehicle and road information relating to the roads other than the one continuing from the fork on the route of movement and according to the agreement of the characteristics of the current road and those of the road continuing from the fork.

Thus, according to the present invention, the guidance notification control section may control the notification of the guidance notification section by comparing road information relating to the current road bearing the moving vehicle on the route of movement, road information relating to the road continuing from the fork located immediately ahead of the moving vehicle in the moving direction of the vehicle and road information relating to the roads other than the one continuing from the fork on the route of movement and according to the agreement of the characteristics of the current road and those of the road continuing from the fork. Then, as a result, the notification of guidance is controlled by referring to agreement of the characteristics of the current road and those of the road continuing from the fork. Therefore, it may be so arranged that, if the roads show a high degree of agreement in terms of characteristics, the guidance notification control section judges that the moving vehicle may not divert from the defined route and controls so as not to provide guidance. Then, only the map information that is utilized for defining the route of movement may be provided as an easy way of controlling guidance to avoid the embarrassment due to unnecessary guidance.

In a navigation apparatus according to the invention, the guidance notification control section preferably uses at least the number of car lanes, the presence or absence of a median strip, the width of the road, the presence or absence of a traffic light as characteristic when judging agreement of two sets of characteristics.

Thus, according to the present invention, the guidance notification control section may use at least the number of car lanes, existence or non-existence of a median strip, the width of existence or non-existence of a traffic light as characteristic when judging agreement of two sets of characteristics. Then, as a result, the guidance notification control section can easily judge if the moving vehicle may or may not divert from the defined route on the basis of the characteristic of the road because notification of guidance is controlled on the basis of the judgment.

A navigation apparatus according to the invention preferably further comprises a requirement information storage section for storing information relating to the predetermined requirements to be commonly met by and the relationship between the characteristics of a road extending beyond a fork and those of a road heading for the fork so that the guidance notification control section may collate the relationship between the characteristics of each of the roads extending beyond the fork located ahead in the moving direction of the moving vehicle and those of the current road bearing the moving vehicle with the predetermined requirements to be commonly met by the characteristics of a road extending beyond a fork and those of a road heading for the fork stored in the requirement information storage section and judge agreement of any of the sets of characteristics of the roads extending beyond the fork and the set of characteristics of the current road.

Thus, according to the present invention, the guidance notification control section may collate the relationship between the characteristics of each of the roads extending beyond the fork located ahead in the moving direction of the moving vehicle and those of the current road bearing the moving vehicle with the predetermined requirements to be commonly met by the characteristics of a road extending beyond a fork and those of a road heading for the fork stored in the requirement information storage section and judge agreement of any of the sets of characteristics of the roads extending beyond the fork and the set of characteristics of the current road. Then, as a result, the guidance notification control section can easily judge agreement of the characteristics of one of the roads and that of the current road because it judges the relationship between the characteristics of the road extending beyond the fork and those of the current road on the basis of the predefined relationship between the characteristics of a road extending beyond a fork and those of a road heading for the fork.

In a navigation apparatus according to the invention, the guidance notification control section preferably judges agreement of the characteristics of a road and those of another on the basis of the number of requirements that are commonly met by the roads.

Thus, according to the present invention, the guidance notification control section may judge agreement of the characteristics of a road and those of another on the basis of the number of requirements that are commonly met by the roads. Then, as a result, the guidance notification control section can easily judge agreement of the characteristics of a road and those of another because it judges on the basis of the number of requirements that are commonly met by the roads.

In a navigation apparatus according to the invention, the guidance notification control section preferably judges agreement of the characteristics of a road and those of another on the basis of the total number of points given to the requirements that are commonly met by the roads.

Thus, according to the present invention, the guidance notification control section may judge agreement of the characteristics of a road and those of another on the basis of the total number of points given to the requirements that are commonly met by the roads. Then, as a result, the guidance notification control section can easily judge agreement of the characteristics of a road and those of another because it judges on the basis of the total number of points given to the requirements that are commonly met by the roads.

In a navigation apparatus according to the invention, the guidance notification control section preferably restricts or suppresses the notification by the guidance notification section when the degree of agreement of the characteristics of the current road bearing the moving vehicle on the route of movement and those of the road continuing from the fork located immediately ahead of the moving vehicle in the moving direction of the vehicle exceeds the degree of agreement of the characteristics of the current road bearing the moving vehicle on the route of movement and those of any other roads extending beyond the fork.

Thus, according to the present invention, the guidance notification control section may restrict or suppress the notification by the guidance notification section when the degree of agreement of the characteristics of the current road bearing the moving vehicle on the route of movement and those of the road continuing from the fork located immediately ahead of the moving vehicle in the moving direction of the vehicle exceeds the degree of agreement of the characteristics of the current road bearing the moving vehicle on the route of movement and those of any other roads extending beyond the fork. Then, as a result, the guidance notification control section can easily judge if the moving vehicle may or may not divert from the defined route because it judges on the basis of any of the sets of characteristics of the roads extending beyond the fork and the set of characteristics of the current road.

A navigation method according to the present invention is developed on the basis of a navigation apparatus according to the invention as described above. More specifically, according to the present invention, there is provided a navigation method for supporting the movement of a moving vehicle by a computing section, the method comprising: recognizing the current location of the moving vehicle and the destination of the moving vehicle; defining the route of movement to be followed by the moving vehicle from the recognized current location to the recognized destination on the basis of map information including road information relating to the locations of forks and the road to be followed by the moving vehicle from each fork to the next; and notifying guidance relating to the movement of the moving vehicle on the basis of information relating to the current road bearing the moving vehicle in the defined route of movement, the road continuing from the fork located immediately ahead of the moving vehicle in the moving direction of the vehicle and the roads from the fork other than the one continuing on the route of movement.

As a result, a navigation method according to the present invention provides advantages similar to those of a navigation apparatus as described above.

Since a navigation method according to the present invention is configured in a manner similar to a navigation apparatus according to the invention, it provides advantages similar to those of a navigation apparatus according to the invention.

In still another aspect of the present invention, there is provided a navigation program that causes computing section to execute a navigation method according to the present invention.

A program according to the present invention may be installed in a general purpose computer that is to be utilized as computing section in order to cause the computing section to execute a navigation method according to the present invention. Then, the utilization of the present invention will be promoted to a great extent.

A recording medium according to the present invention stores a navigation program according to the invention as described above in such a way that it can be read by computing section.

Since a navigation program according to the present invention is stored in a recording medium according to the present invention, the navigation program can be handled with ease so that the utilization of the present invention will be promoted to a great extent.

For a navigation program or a recording medium according to the present invention, computing section may be defined as a personal computer, a plurality of computers combined with and connected to each other to form a network, a device such as a microcomputer that may be an IC or a CPU or a circuit substrate on which a plurality of electric parts are mounted.

DETAILED DESCRIPTION OF THE PREFERRED EMBODIMENTS

Now, the present invention will be described in greater detail by referring to the accompanying drawings that illustrate a preferred embodiment of the present invention.
[Configuration of Navigation Apparatus]

Figure 1:
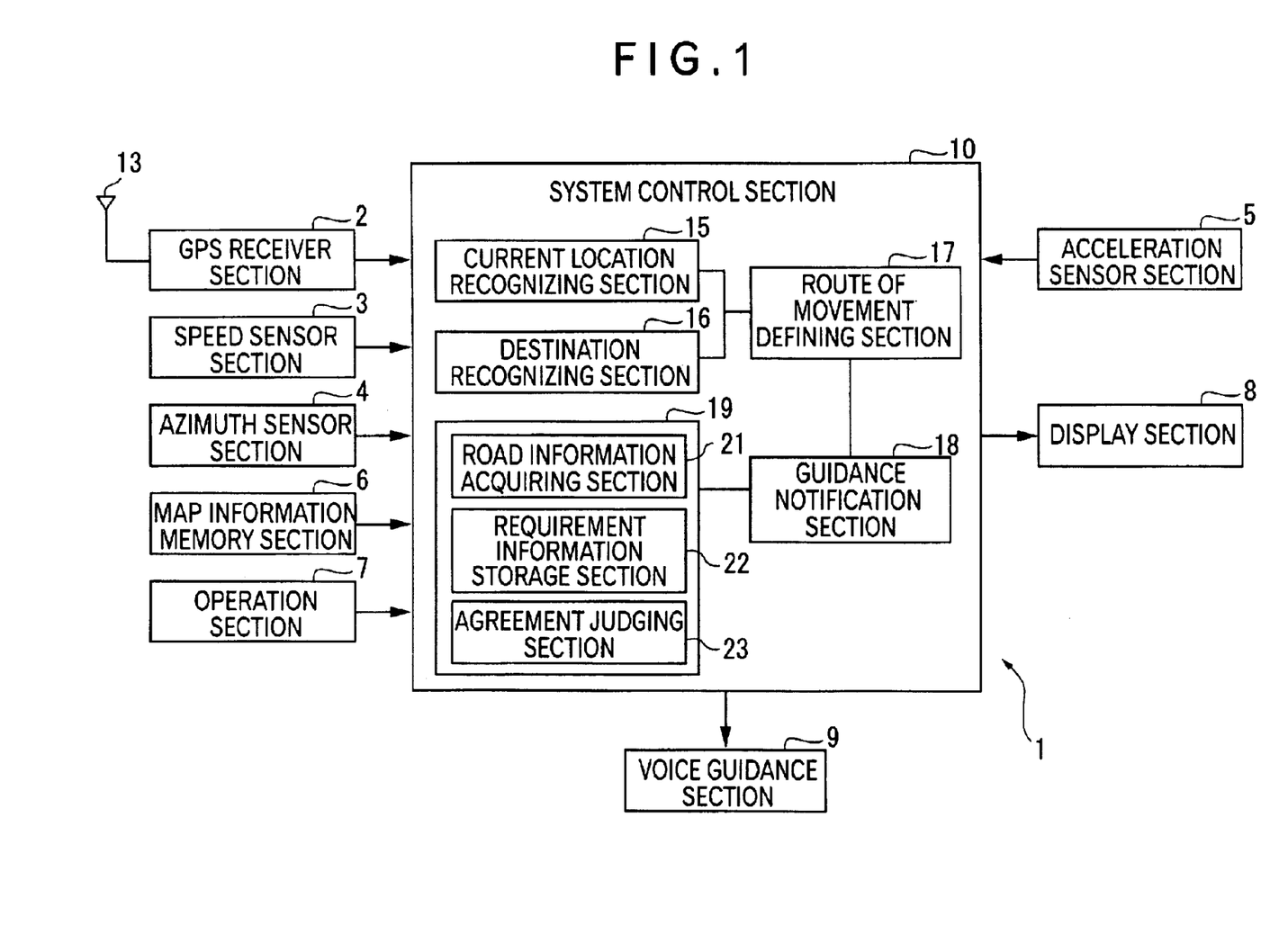
FIG. 1 is a block diagram schematically illustrating the configuration of an embodiment of navigation apparatus according to the present invention.
Figure 2A:
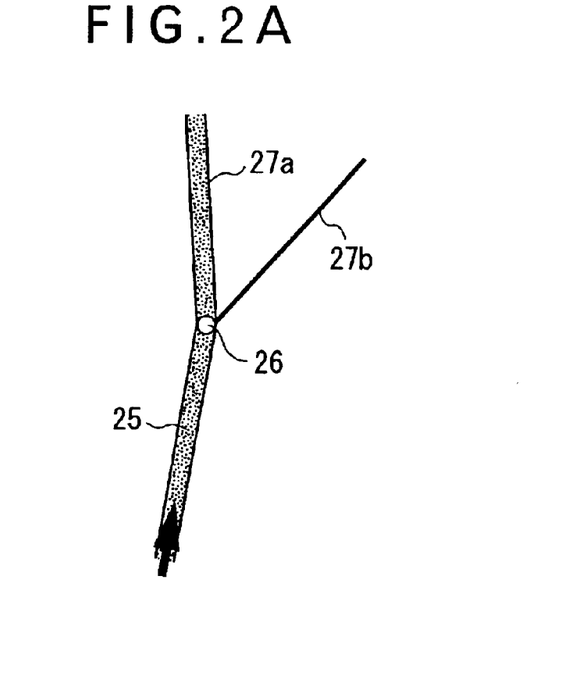
FIGS. 2A and 2B schematically illustrate road information that can be used for the embodiment of FIG. 1.
Figure 2B:
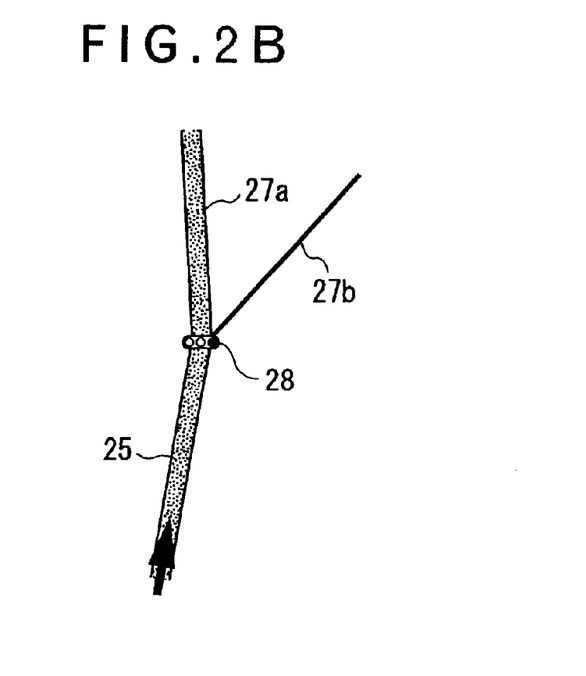

FIG. 1 is a block diagram schematically illustrating the configuration of an embodiment of navigation apparatus according to the present invention. FIGS. 2A and 2B schematically illustrate roads.

Reference symbol 1 in FIG. 1 denotes a navigation apparatus according to the invention, which may be arranged in a vehicle that may typically be a sedan. The navigation apparatus 1 is driven to operate as it is powered by a battery mounted in the vehicles as accessory power source.

The navigation apparatus 1 comprises a GPS (global positioning system) receiver section 2, a speed sensor section 3, an azimuth sensor section 4, an acceleration sensor section 5, a map information memory section 6 operating as map information storage section, an operation section 7, a display section 8, a voice guidance section 9 and a system control section 10.

A GPS antenna 13 is connected to the GPS receiver section 2. The GPS receiver section 2 receives a navigation radio wave output from a GPS satellite (not shown), which is an artificial satellite, by way of the GPS antenna 13. Then, the GPS receiver section 2 computationally determines the pseudo-coordinate values of the current location on the basis of the received signal and outputs the determined pseudo-coordinate values to the system control section 10 as GPS data.

The speed sensor section 3 is arranged in the vehicle to detect the running speed of the vehicle. Then, the speed sensor section 3 converts the detected running speed of the vehicle into a speed data typically in the form of a pulse or voltage and outputs it to the system control section 10.

The azimuth sensor section 4 is also arranged in the vehicle and has a so-called gyro-sensor. Thus, it detects the azimuth of the vehicle or the running direction in which the vehicle proceeds. Then, the azimuth sensor section 4 converts the detected running direction of the vehicle into an azimuth data typically in the form of a pulse or voltage and outputs it to the system control section 10.

The acceleration sensor section 5 is also arranged in the vehicle and compares, for instance, the gravity acceleration and the acceleration produced by the running movement of the vehicle to detect the moving condition of the vehicle in the vertical direction. Then, the acceleration sensor section 5 converts the detected running condition of the vehicle into an acceleration data typically in the form of a pulse or voltage and outputs it to the system control section 10.

The map information memory section 6, or map information storage section, readably stores map information on road maps and other additional information necessary for guiding the running vehicle, which will be described hereinafter. For instance, it has a drive unit for reading map information and additional information stored in an optical or magnetic disc, which may be a DVD-ROM (digital versatile disc-read only memory) or hard disc. Then, the map information memory section 6 appropriately outputs the map information and/or the additional information it reads to the system control section 10. The arrangement of the map information storage section is not limited to that of a map information memory section 6 as described above. Alternatively, it may be so arranged that it has a communication section and operates like a mobile phone or a PHS (personal handyphone system) terminal to acquire and store map information and/or additional information transmitted from a base station by way of a wireless medium, which information is then appropriately output to the system control section 10.

The operation section 7 has various operation buttons (not shown) for appropriately operating the navigation apparatus 1 including one for issuing a command for displaying the moving condition, or the running condition, of the vehicle. As any of the operation buttons is operated to input a data or command, the operation section 7 outputs a corresponding signal to the system control section 10 to specify an operation to be performed, which may be an operation of specifying the destination of the vehicle. The operation buttons of the operation section 7 may be replaced by a touch panel that may be arranged in the display section 8 or a voice input device by which a command may be input as voice command.

The display section 8 appropriately displays the map information and/or the additional information output from the map information memory section 6, the TV image data received by means of a TV receiving set (not shown) and the image data stored in the recording medium such as an optical disc or magnetic disc and read by the drive unit. More specifically, the display section 8 may be realized by using liquid crystal, organic EL (electroluminescence), a PDP (plasma display panel) or a CRT (cathode ray tube).

The voice guidance section 9 has a voicing section such as a loudspeaker (not shown). The voice guidance section 9 notifies the passenger and other persons in the vehicle of various pieces of information necessary for guiding the vehicle such as the running direction and the running condition of the vehicle by voice output from the voicing section. The voicing section may appropriately output voice the TV voice data received by means of the TV receiving set or some of the voice data recorded in the optical or magnetic disc.

The system control section 10 has various input/output ports (not shown) such as a GPS reception port connected to the GPS receiver section 2, a key input port connected to the operation section 7, a display control port connected to the display section 8 and a voice control port connected to the voice guidance section 9. The system control section 10 is provided with a current location recognizing section 15, a destination recognizing section 16, a route of movement defining section 17, a guidance notification section 18 and a guidance notification control section 19 as programs developed on the OS (operating system) for controlling the overall operation of the navigation apparatus 1.

The current location recognizing section 15 computationally determines a plurality of current pseudo-locations of the vehicle on the basis of the speed data and the azimuth data output respectively from the speed sensor section 3 and the azimuth sensor section 4. Additionally, the current location recognizing section 15 recognizes the current pseudo-coordinate values of the vehicle on the basis of the GPS data for the current location output from the GPS receiver section 2. Then, the current location recognizing section 15 recognizes the current location of the vehicle by comparing the computationally determined current pseudo-locations and the recognized current pseudo-coordinate values and computationally determining the current location of the vehicle to be displayed on the map information that is displayed in the display section 8.

Additionally, the current location recognizing section 15 recognizes the current location of the vehicle by judging the inclination or the difference of height of the road on which the vehicle is running on the basis of the acceleration data of the vehicle output from the acceleration sensor section 5 and computationally determining the current pseudo-locations of the vehicle. Thus, it can accurately recognize the current location of the vehicle if the vehicle needs to be located vertically on a spot in a map because it is on a multi-level crossing or flyover roadway. When the vehicle is running on a mountain road or slope, the current location recognizing section 15 can accurately recognize the current location of the vehicle by correcting the error produced by the difference between the moving distance obtained theoretically from speed data and azimuth data and the distance actually covered by the vehicle by using the detected inclination of the road.

Furthermore, the current location recognizing section 15 computationally determines the running speed and the running direction of the vehicle and obtains information on the distance covered by the vehicle on the basis of speed data, azimuth data and acceleration data. The current location recognizing section 15 can also recognize the starting point specified and input at the operation section 7 as starting point as pseudo-current location in addition to the above described current location of the vehicle.

The various pieces of information obtained by the current location recognizing section 15 are then stored in memory section (not shown) such as RAM (Random Access Memory) arranged in the system control section 10. However, it should be noted that the memory section may alternatively be arranged outside the system control section 10 instead of being arranged in the system control section 10 if the memory section can exchange information with the system control section 10. More specifically, it may be arranged in a data base connected to the system control section 10 or in a server that is connected to the system control section 10 by way of communication section so as to be able to exchange information with the system control section 10 by way of a wireless medium.

The destination recognizing section 16 acquires destination information relating the destination specified and input as a result of an input operation at the operation section 7 and recognizes the location of the destination. Information that can be utilized to specify and input the destination include coordinate values such as latitude and longitude, an address, a telephone number and other pieces of information that can be used for specifying a location. The information on the destination recognized by the destination recognizing section 16 is stored in the memory section.

The route of movement defining section 17 defines the route of movement from the current location of the vehicle recognized by the current location recognizing section 15 or the current pseudo-location such as the starting point specified and input at the operation section 7 to the destination recognized by the destination recognizing section 16. More specifically, the route of movement is typically defined by searching for the roads through which a vehicle can move on the basis of the map information and the additional information acquired from the map information memory section 6 and selecting a route that provides the shortest moving time, a route that provides the shortest moving distance or a route that can avoid traffic jams and traffic restrictions. The defined route of movement is stored in the memory section. It is also displayed appropriately on the display section 8 in response to an input operation at the operation section 7.

The guidance notification section 18 provides the vehicle passenger with guidance for driving the vehicle typically stored in the memory section so as to correspond to the running condition of the vehicle and support the passenger. The guidance may be provided in the form of voice emitted from the voice guidance section 9 and/or an image displayed on the display section 8. The guidance in voice may be "Please follow the right way toward ΔΔ at the fork ○○ 700*m* ahead", "You diverted from the route of movement" or "You have a traffic jam ahead".

The guidance notification control section 19 restricts or suppresses the notification by the guidance notification section 18 depending on the condition of the road on which the vehicle is running. The guidance notification control section 19 has a road information acquiring section 21, a requirement information storage section 22 and an agreement judging section 23.

The road information acquiring section 21 acquires road information from the map information memory section 6.

The information it acquires include current road information which is road information relating to a current road 25 on which the vehicle is currently running, fork information which is road information relating to a fork location 26 located ahead of the road on which the vehicle is running as viewed in the running direction of the vehicle, branch road information which is road information relating to branch roads 27a, 27b extending from the fork location 26 excepting the road on which the vehicle is running, mark information which is road information relating to, for example, the mark indicating a traffic light 28 at the fork location 26 and well known site/object information, which will be described hereinafter. The acquired road information is stored in the memory section.

The requirement information storage section 22 stores the requirement information to be collated with the road information acquired by the road information acquiring section 21 and point information relating to the points correlated with the requirement information in such a way that the stored information may be output appropriately.

Requirement information may typically include information asking if the current road 25 on which the vehicle is running and the branch road 27a are roads of the same category or not, if the angle formed by the current road 25 and the branch road 27a that is found on the route of movement is not more than a predetermined angle, 30° for example, if the angle formed by the current road 25 and the branch road 27b that is not found on the route of movement is not less than a predetermined angle, 60° for example, if the branch road 27b that is not found on the route of movement belongs to the category of prefectural roads or a lower road category or not, if the branch road 27b that is not found on the route of movement belongs to a road category lower than the road category of the branch road 27a that is found on the route of movement or not, if the road category of the branch road 27b that is not found on the route of movement is other than the category of main lines or not, if the road category of the current road 25 is that of main lines or not, if the current road 25 and the branch road 27a on the route of movement have two or more than two lanes for each direction or not, if the current road 25 and the branch road 27a on the route of movement have a median strip or not, if the branch road 27b that is not found on the route of movement has only a single lane in each direction or not, if the branch road 27b that is not found on the route of movement does not have a median strip, if the roads are keep left roads or not, if the branch road 27a on the route of movement is located at the left side relative to the current road 25, if the branch road 27a on the route of movement is located at the right side relative to the current road 25, if the width or the number of lanes of the current road 25 differs from the width or the number of lanes, whichever appropriate, of the branch road 27a on the route of movement, if the width or the number of lanes of the current road 25 is same as the width or the number of lanes, whichever appropriate, of the branch road 27b that is not on the route of movement, if the fork 26 has a traffic light 28 or not and so on.

Point information relates to the number of points that is correlated with each of the above listed items of the requirement information. For the purpose of the present invention, two or more than two numbers of points may be the same with each other and the number of points of any item may have a negative value.

The agreement judging section 23 collates the road information acquired by the road information acquiring section 21 with the requirement information acquired from the requirement information storage section 22 and judges agreement among the characteristics of the roads 25 heading for the fork location 26 and the characteristics of the road 27a and those of the road 27b extending from the fork location 26. The judgment on agreement is made by adding and/or subtracting numbers of points, using the point information correlated with the requirement information that is found to be relating as a result of the collation and comparing the obtained total number of points with a predetermined point threshold value. It is so judged that the vehicle may not divert from the defined route of movement after the branch location 26 if the total number of points is greater than the point threshold value, whereas the vehicle may divert from the defined route of movement after the branch location 26 if the total number of points is not greater than the point threshold value.

Then, if it is so judged by the agreement judging section 23 that the vehicle may not divert from the route of movement, the guidance notification control section 19 controls the guidance notification section 18 so as to restrict or suppress the notification of guidance for the movement of the vehicle.

Figure 3:
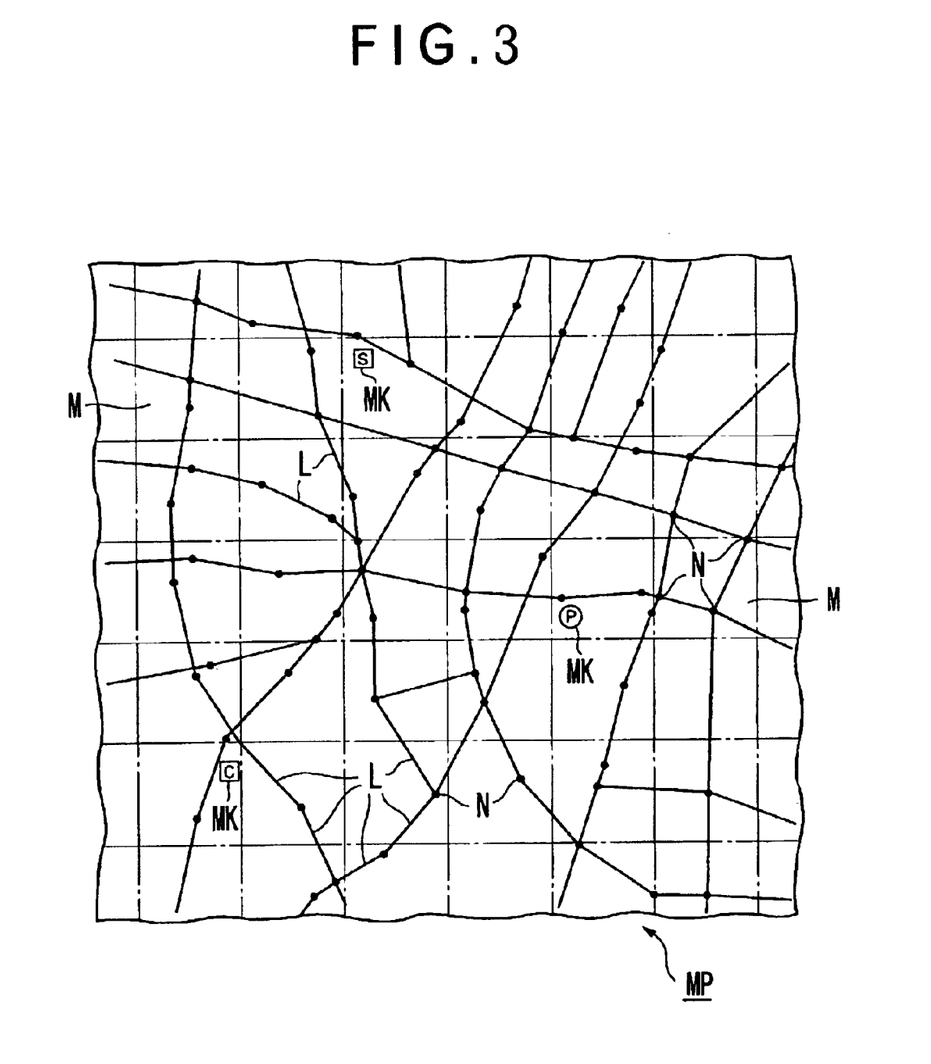
FIG. 3 is a map illustrating the data structure of map information that can be used for the embodiment of FIG. 1.

Now, map information will be described by referring to FIG. 3. FIG. 3 is a map illustrating the data structure of map information that can be used for the embodiment of FIG. 1.

In FIG. 3, reference symbol MP denotes map information. The map information MP includes a plurality of pieces of mesh information M to which specific respective numbers are assigned and annexed. The pieces of mesh information M include the defined length of each side that is obtained by reduction to reflect the reduced scale of the map relative to the actual ground. Thus, the map information MP is obtained by longitudinally and transversally connecting the pieces of mesh information M.

In the map information MP, roads are segmented and each segment of road is expressed by a pair of nodes N (a pair of black dots in FIG. 3) and a line, or a link L, connecting the nodes N. Thus, road information is prepared by using nodes N and links L. Each node N may indicate a crossing of roads, a bending point of a road, a fork or a junction. The information on each node N includes information on the location of the node N expressed in terms of, for example, latitude and longitude, the specific number annexed to the node N and fork information telling if the node N is a crossing or a fork location where a number of links meet or not. The information on each link L includes the specific number annexed to the link L and node information on the nodes N linked by the link L including the specific numbers annexed to the respective nodes N.

The map information MP also includes marks MK assigned respectively to well known sites, well known buildings, traffic lights and so on, well known site/object information on the locations of the well known sites and the well known buildings expressed in terms of, for example latitude and longitude and road information on the number of lanes correlated with each link L as characteristics of road such as the number of lanes, the existence or non-existence of a median strip, the width and so on. The map information MP additionally includes denomination information such as the denomination of each crossing.

The map information MP further includes a plurality of pieces of map information MP for illustrating the same regions with different reduced scales. Each of the pieces of map information MP for illustrating the same regions with different reduced scales by turn includes various pieces of information such as node information link IDs, well known site/object information, road information and denomination information as described above.

[Operation of Navigation Apparatus]

Figure 4:
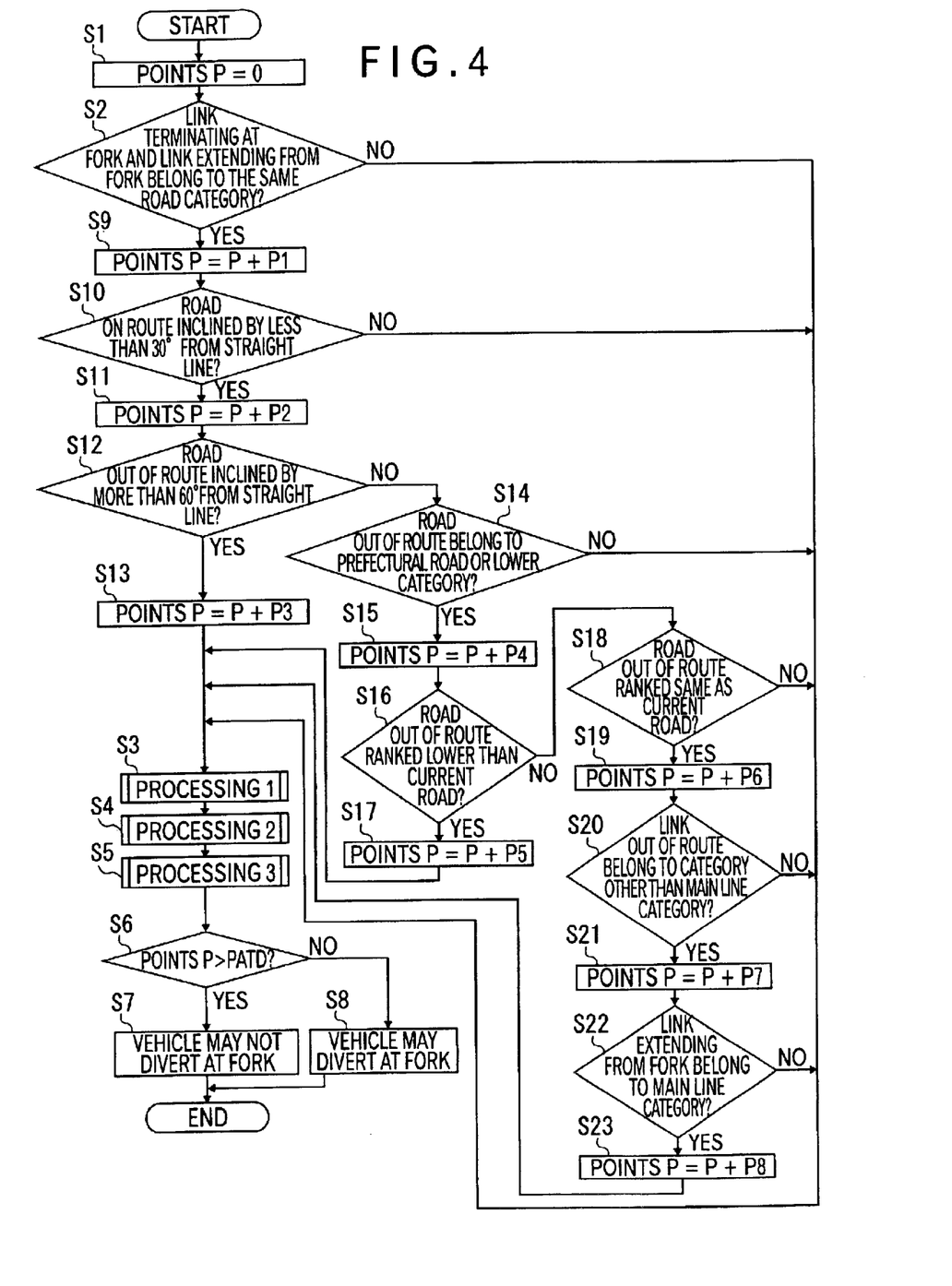
FIG. 4 is a flow chart of operation of the first embodiment of navigation apparatus of FIG. 1, illustrating an operation of judging that the vehicle may not divert from the defined route to be followed so as to restrict or suppress guidance.
Figure 5:
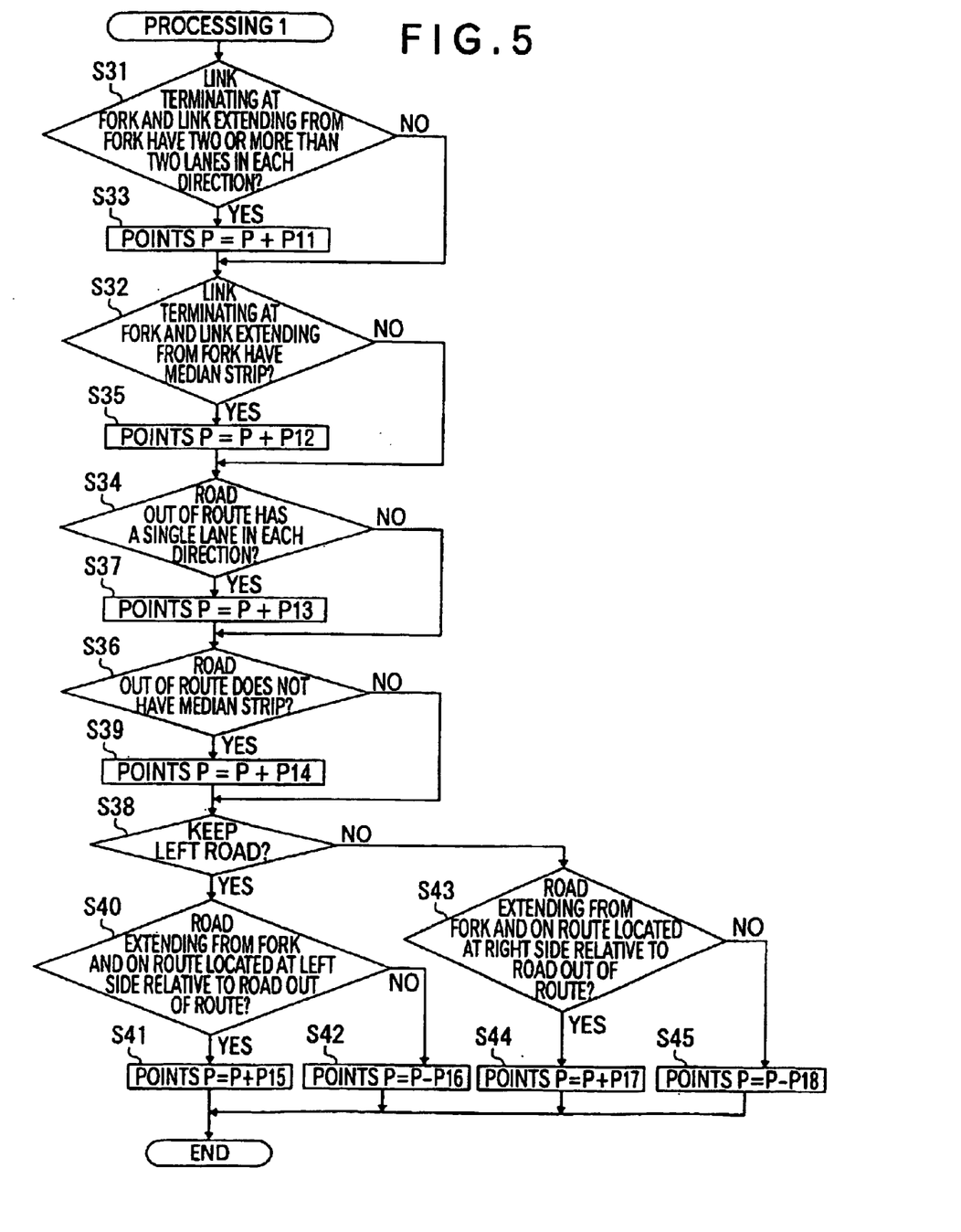
FIG. 5 is a flow chart of the operation of judging that the vehicle may not divert from the defined route to be followed in processing 1 of FIG. 4.
Figure 6:
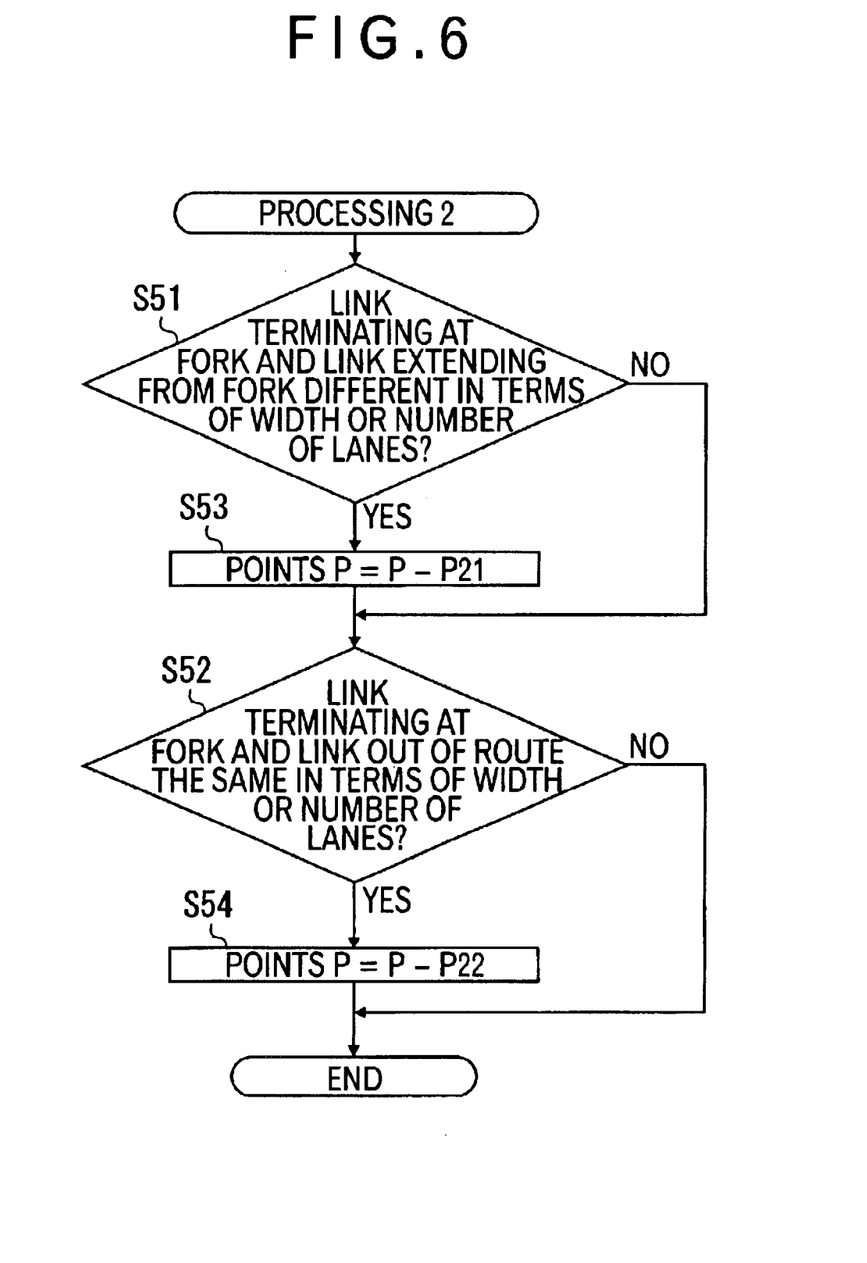
FIG. 6 is a flow chart of the operation of judging that the vehicle may not divert from the defined route to be followed in processing 2 of FIG. 4.
Figure 7:
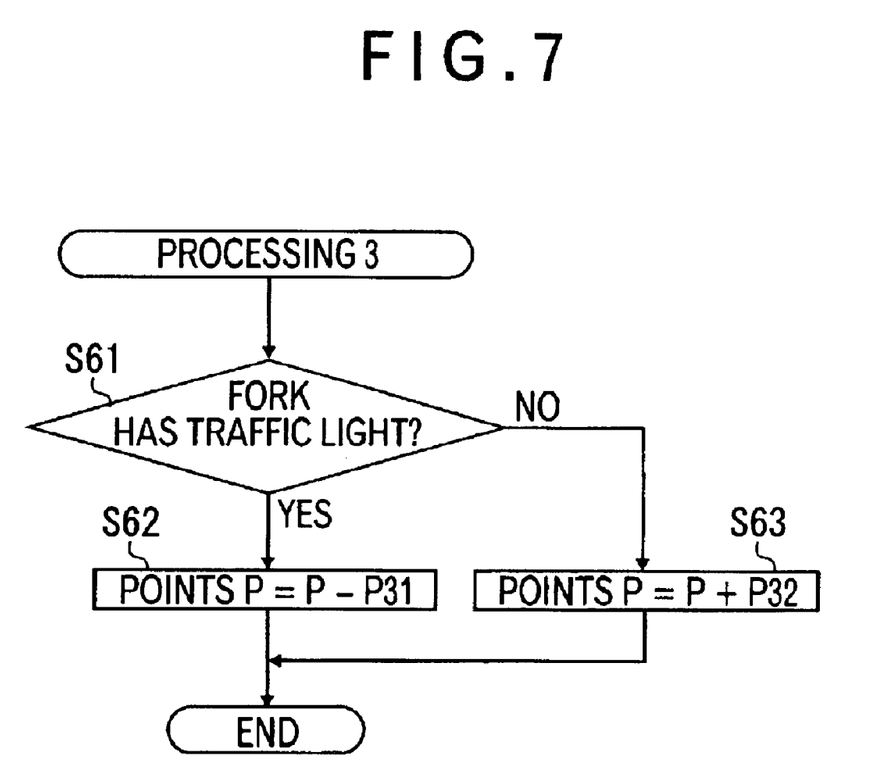
FIG. 7 is a flow chart of the operation of judging that the vehicle may not divert from the defined route to be followed in processing 3 of FIG. 4.

Now, the operation of the above described navigation apparatus 1 will be described by referring to the flow charts of FIGS. 4 through 7. FIG. 4 is a flow chart of operation of the navigation apparatus, illustrating an operation of judging that the vehicle may not divert from the defined route to be followed so as to restrict or suppress guidance and FIG. 5 is a flow chart of the operation of judging that the vehicle may not divert from the defined route to be followed in processing 1 of FIG. 4, whereas FIG. 6 is a flow chart of the operation of judging that the vehicle may not divert from the defined route to be followed in processing 2 of FIG. 4. FIG. 7 is a flow chart of the operation of judging that the moving vehicle may not divert from the defined route to be followed in processing 3 of FIG. 4.

As the power switch of the vehicle is turned on by the passenger who rides on the passenger seat or a fellow passenger who rides on the assistant seat, the navigation apparatus 1 is powered to start operating. The passenger causes the navigation apparatus 1 to define the route of movement by operating the operation section 7 to input necessary data. More specifically, the destination is specified by the passenger who operates the operation section 7. Then, the passenger specifies various route searching requirements such as selection of a route that provides the shortest moving time, a route that provides the shortest moving distance or a route that can avoid traffic jams and traffic restrictions in order to make the route of movement defining section 17 define the route of movement that satisfies the requirements.

To be more accurate, the current location recognizing section 15 recognizes the current location of the vehicle on the basis of GPS data, speed data, azimuth data and acceleration data. The destination recognizing section 16 recognizes the destination on the basis of the information on the destination specified by means of the operation section 7. Then, the route of movement defining section 17 defines the route of movement from the current location recognized by the current location recognizing section 15 to the destination recognized by the destination recognizing section 16 on the basis of the map information MP and the additional information. The system control section 10 stores the defined route of movement in the memory section and appropriately displays the route of movement on the display section 8 along with the map information MP.

Thereafter, the passenger drives the vehicle in such a way that the current location displayed on the display section 8 moves on the route of movement. The running condition of the vehicle is detected by the data output from the speed sensor section 3, the azimuth sensor section 4 and the acceleration sensor section 5. The system control section 10 judges if the vehicle may not divert from the route of movement or not as a result of the operation illustrated in the flow chart of FIG. 4 by detecting the running condition of the vehicle.

More specifically, the system control section 10 causes the agreement judging section 23 to specify nil for the total number of points, or P=0, by detecting that the vehicle has just started running on the basis of the data from the sensor sections 3, 4, 5. In other words, the system control section 10 initializes the agreement judging section 23 (Step S1) because it does not judge if the vehicle may divert from the route of movement or not. Additionally, the system control section 10 acquires road information including current road information, fork information and branch road information by way of the road information acquiring section 21 on the basis of the current location as recognized by the current location recognizing section 15 and the road information of the map information memory section 6. Thus, the system control section 10 will acquire current road information on the current road 25 on the basis of the current location, fork information on the fork location 26 located ahead of the moving vehicle and branch road information on the branch roads 27a, 27b extending from the fork location 26.

Then, the system control section 10 causes the agreement judging section 23 to compare the road information acquired by way of the road information acquiring section 21 and the requirement information stored in the requirement information storage section 22. Then, the system control section 10 judges if the current road 25 and the branch road 27a belong to the same road category or not (Step S2), which is one of the requirements to be met in the requirement information. If the system control section 10 judges that they do not belong to the same road category, it cannot be determined that the vehicle may not divert from the route of movement if the branch road 27a is taken. Therefore, the system control section 10 sequentially performs the operations of processing 1, processing 2 and processing 3 (Steps S3 through S5) and subsequently determines if the total number of points P is greater than the point threshold value Patd stored in advance in the memory section or not (Step S6).

If it is determined in Step S6 that the total number of points P is greater than the point threshold value Patd, the system control section 10 judges that the vehicle may not divert from the route of movement at the fork (Step S7). If, on the other hand, it is determined in Step S6 that the total number of points P is not greater than the point threshold value Patd, the system control section 10 judges that the vehicle may divert from the route of movement at the fork (Step S8). Note that, if it is judged if the current road 25 and the branch road 27a do not belong to the same road category, the total number of points P is still equal to 0 and hence the system control section 10 judges that the vehicle may divert from the route of movement at the fork in Step S8.

If the system control section 10 judges by way of the agreement judging section 23 that the vehicle may divert from the route of movement in Step S8, it causes the guidance notification section 18 to provide a guidance notification relating to the moving direction of the vehicle to the passenger. In practice, the guidance notification section 18 may tell the passenger "Please follow the right way toward ΔΔ at the fork ○○m ahead."

If the system control section 10 judges by way of the agreement judging section 23 that the vehicle may not divert from the route of movement in Step S7, it restricts or suppresses the guidance notification of the guidance notification section 18 for the moving direction. In practice, the system control section 10 may control the guidance notification section 18 so as to reduce the number of times of telling "Please go forward" or "Please follow the left way" or completely stop telling so.

If it is judged in Step S2 that the requirement is met and hence the current road 25 and the branch road 27a belong to the same road category, the system control section 10 judges that the two roads are similar to each other and possibly the vehicle may not divert from the route of movement. Then, the agreement judging section 23 adds the number of points P1 correlated with the requirement to the total number of points P (Step S9). Additionally, the agreement judging section 23 collates the acquired road information and another requirement in the requirement information. It may determine if the angle formed by the current road 25 and the branch road 27a that is found on the route of movement is not more than a predetermined angle, 30° for example. In other words, it may determine if the road to be taken in order to leave the current road is inclined by 30° or less relative to the straight line extended from the current road (Step S110).

If it is determined in Step S10 that the angle formed by the current road 25 and the branch road 27a that is found on the route of movement is not less than 30°, it is no longer possible to judge that the vehicle may not divert from the route of movement if it takes the branch road 27a. Therefore, the system control section 10 proceeds to Step S3 for an operation of processing 1. If, on the other hand, it is determined in Step S10 that the angle formed by the current road 25 and the branch road 27a is not more than 30°, it is judged that the vehicle may not divert from the route of movement if it takes the branch road 27a. Then, the agreement judging section 23 adds the number of points P2 correlated with the requirement to the total number of points (Step S11).

Furthermore, the agreement judging section 23 collates the acquired road information and still another requirement in the requirement information. It may determine if the angle formed by the current road 25 and the branch road 27b that is not found on the route of movement is not less than a predetermined angle, 60° for example (Step S12). Similarly, if it is determined in Step S12 that the angle formed by the current road 25 and the branch road 27b that is not found on the route of movement is not less than 60°, the agreement judging section 23 judges that the vehicle may possibly divert from the route of movement if it takes the branch road 27b that is not on the route of movement. Then, the agreement judging section 23 adds the number of points P3 correlated with the requirement to the total number of points (Step S13), and the system control section 10 sequentially performs the operations of processing 1 in Step S3 and so on.

If, on the other hand, it is determined in Step S12 that the angle formed by the current road 25 and the branch road 27b that is not found on the route of movement is not more than 60°, both the branch road 27a that is on the route of movement and the branch road 27b that is not on the route of movement form a substantially same angle with the straight line extended from the current road. Therefore, the agreement judging section 23 further collates the acquired road information with still another requirement. For example, it may determine if the branch road 27b that is not on the route of movement belongs to category of prefectural roads or a lower road category or not (Step S14).

If it is determined in Step S14 that the branch road 27b that is not on the route of movement does not belong to the category of prefectural roads or a lower road category, the agreement judging section 23 judges that the branch road 27b is not a byroad. Then, it is no longer possible to judge if the vehicle may divert from the route of movement or not if it takes the branch road 27a that is on the route of movement, the system control section 10 proceeds to Step S3. If, on the other hand, it is determined in Step S14 that the branch road 27b belongs to the category of preferctural road or a lower road category, it is possible to judge that the branch road 27b is a byroad and hence the vehicle may not divert from the route of movement if it takes the branch road 27a. Therefore, the agreement judging section 23 adds the number of points P4 correlated with the requirement to the total number of points P (Step S 15).

Furthermore, the agreement judging section 23 collates the acquired road information and still another requirement in the requirement information. For instance, it may determine if the rank of the road category of the branch road 27b that is not on the route of movement is lower than the rank of the road category of the branch road 27a that is on the route of movement or not (Step S16). If it is determined in Step S16 that the rank of the road category of the branch road 27b is lower than the rank of the road category of the branch road 27a, it is possible to judge that the branch road 27b is a byroad and possibly the vehicle may not divert from the route of movement if it takes the branch road 27a. Therefore, the agreement judging section 23 adds the number of points P5 correlated with the requirement to the total number of points P (Step S17).

If, on the other hand, it is determined in Step S16 that the rank of the road category of the branch road 27b is not lower than the rank of the road category of the branch road 27a, it is neither possible to judge that the branch road 27b is a byroad nor possible to tell if the vehicle may not divert from the route of movement if it takes the branch road 27a. Therefore, the agreement judging section 23 further collates the acquired road information and still another requirement in the requirement information. For instance, it may determine if the rank of the road category of the branch road 27b that is not on the route of movement is the same as the rank of the road category of the branch road 27a that is on the route of movement or not (Step S18).

If it is determined in Step S18 that the rank of the road category of the branch road 27b is not the same as the rank of the road category of the branch road 27a, it is possible to judge at least that the branch road 27b is not a byroad. Therefore, the agreement judging section 23 cannot judge if the vehicle may not divert from the route of movement if it takes the branch road 27a and hence the system control section 10 proceeds to Step S3.

If, on the other hand, it is determined in Step S18 that the road category of the branch road 27b is the same as the rank of the road category of the branch road 27a, the agreement judging section 23 judges that possibly the vehicle may not divert from the route of movement if it takes the branch road 27a and adds the number of points P6 correlated with the requirement to the total number of points P (Step S119).

Furthermore, the agreement judging section 23 collates the acquired road information and still another requirement in the requirement information. For instance, it may determine if the road category of the branch road 27b that is not on the route of movement is that of main lines or not (Step S20). If it is determined in Step S20 that the branch road 27b is not other than a main line and hence it is a main line, the agreement judging section 23 judges that the branch road 27b is not a byroad. Therefore, the agreement judging section 23 cannot judge if the vehicle may not divert from the route of movement if it takes the branch road 27a and hence the system control section 10 proceeds to Step S3.

If, on the other hand, it is determined in Step S20 that the branch road 27b is other than a main line, the agreement judging section 23 judges that the branch road 27b is a branch of the main line. Therefore, the agreement judging section 23 judges that possibly the vehicle may not divert from the route of movement if it takes the branch road 27a and adds the number of points P7 correlated with the requirement to the total number of points P (Step S21).

Additionally, the agreement judging section 23 collates the acquired road information and still another requirement in the requirement information. For instance, it may determine if the road category of the current road 25 is that of main lines or not (Step S22). If it is determined in Step S22 that the current road 25 is not a main line, the agreement judging section 23 judges that the current road 25 is a byroad that is getting to a junction. Therefore, the agreement judging section 23 cannot judge if the vehicle may not divert from the route of movement if it takes the branch road 27a and hence the system control section 10 proceeds to Step S3.

If, on the other hand, it is determined in Step S22 that the current road 25 is a main line, the vehicle may not divert from the route of movement if it takes the branch road 27*a*. Therefore, the agreement judging section 23 adds the number of points P8 correlated with the requirement to the total number of points P (Step S23) and the system control section 10 proceeds to Step S3 for an operation of processing 1.

The operation of processing 1 in Step S3 is that of judging if the vehicle may not divert from the route of movement if it follows the branch road 27*a* according to the flow chart of FIG. 5. Referring to FIG. 5, the agreement judging section 23 collates the acquired road information and still another requirement in the requirement information. For instance, it may determine if the current road 25 and the branch road 27*a* on the route of movement have two or more than two lanes for each direction or not (Step S31).

If it is determined in Step S31 that the current road 25 and the branch road 27*a* on the route of movement do not have two or more than two lanes for each direction, it is not possible to tell if the vehicle may not divert from the route of movement if it takes the branch road 27*a*. Therefore, the agreement judging section 23 collates the acquired road information and still another requirement in the requirement information. For instance, it may determine if the current road 25 and the branch road 27*a* on the route of movement have a median strip or not (Step S32).

If, on the other hand, it is determined in Step S31 that both the current road 25 and the branch road 27*a* on the route of movement have two or more than two lanes for each direction, the agreement judging section 23 judges that the roads are relatively large roads. Therefore, the agreement judging section 23 further judges that the vehicle may not divert from the route of movement if it takes the branch road 27*a* and adds the number of points P11 correlated with the requirement to the total number of points P (Step S33) and the system control section 10 proceeds to Step S32. If it is determined in Step S32 that the current road 25 and the branch road 27*a* on the route of movement do not have a median strip, it is not possible to tell that the vehicle may not divert from the route of movement if it takes the branch road 27*a*. Therefore, the agreement judging section 23 collates the acquired road information and still another requirement in the requirement information. For instance, it may determine if the branch road 27*b* that is not found on the route of movement has only a single lane in each direction or not (Step S34).

If, on the other hand, it is determined in Step S32 that the current road 25 and the branch road 27*a* on the route of movement have a median strip, the agreement judging section 23 judges that possibly the vehicle may not divert from the route of movement if it takes the branch road 27*a* and adds the number of points P12 correlated with the requirement to the total number of points P (Step S35) and the system control section 10 proceeds to Step S34.

If it is determined in Step S34 that the branch road 27*b* has two or more than two lanes in each direction, it is not possible to tell if the vehicle may not divert from the route of movement if it takes the branch road 27*a*. Therefore, the agreement judging section 23 collates the acquired road information and still another requirement in the requirement information. For instance, it may determine if the branch road 27*b* that is not found on the route of movement has a median strip or not (Step S36).

If, on the other hand, it is determined in Step S34 that the branch road 27*b* that is not found on the route of movement has only a single lane in each direction, the agreement judging section 23 judges that the vehicle may not divert from the route of movement if it takes the branch road 27*a* and adds the number of points P13 correlated with the requirement to the total number of points P (Step S37) and the system control section 10 proceeds to Step S36.

If it is determined in Step S36 that the branch road 27*b* may not be without a median strip, or has a median strip, it is not possible to tell if the vehicle may not divert from the route of movement if it takes the branch road 27*a*. Therefore, the agreement judging section 23 collates the acquired road information and still another requirement in the requirement information. For instance, it may determine if the roads are keep left roads or not (Step S38).

If, on the other hand, it is determined in Step S36 that the branch road 27*b* does not have a median strip, it is possible for the agreement judging section 23 to tell that the vehicle may not divert from the route of movement if it takes the branch road 27*a* and hence it adds the number of points P14 correlated with the requirement to the total number of points P (Step S39) and the system control section 10 proceeds to Step S38.

If it is determined in Step S38 that the roads are keep left roads, the agreement judging section 23 collates the acquired road information and still another requirement in the requirement information. For instance, it may determine if the branch road 27*a* on the route of movement is located at the left side relative to the current road 25 or not (Step S40). If it is determined that the branch road 27*a* is located at the left side relative to the current road 25, the vehicle does not need to cross the lanes of the opposite direction. Therefore, the agreement judging section 23 judges that possibly the vehicle may not divert from the route of movement if it takes the branch road 27*a* and adds the number of points P15 correlated with the requirement to the total number of points P (Step S41) and the system control section 10 ends the operation of processing 1.

If, on the other hand, it is determined in Step S40 that the branch road 27*a* is not located at the left side relative to the current road 25 and hence it is located at the right side, the vehicle needs to cross the lanes of the opposite direction. Therefore, the agreement judging section 23 judges that possibly the vehicle may divert from the route of movement if it takes the branch road 27*a* and subtracts the number of points P16 correlated with the requirement from the total number of points P (Step S42) and the system control section 10 ends the operation of processing 1.

If, on the other hand, it is determined in Step S38 that the roads are not keep left roads and they are keep right roads, the navigation apparatus 1 judges that the roads are those of a different traffic system. Thus, the agreement judging section 23 collates the acquired road information and still another requirement in the requirement information. For instance, it may determine if the branch road 27*a* on the route of movement is located at the right side relative to the current road 25 or not (Step S43). If it is determined that the branch road 27*a* is located at the right side relative to the current road 25, the vehicle does not need to cross the lanes of the opposite direction for keep right driving. Therefore, the agreement judging section 23 judges that possibly the vehicle may not divert from the route of movement if it takes the branch road 27*a* and adds the number of points P17 correlated with the requirement to the total number of points P (Step S44) and the system control section 10 ends the operation of processing 1.

If, on the other hand, it is determined in Step S43 that the branch road 27*a* is not located at the right side relative to the current road 25 and hence it is located at the left side, the vehicle needs to cross the lanes of the opposite direction.

Therefore, the agreement judging section 23 judges that possibly the vehicle may divert from the route of movement if it takes the branch road 27a and subtracts the number of points P18 correlated with the requirement from the total number of points P (Step S45) and the system control section 10 ends the operation of processing 1.

After ending the operation of processing 1 in Step S3, the agreement judging section 23 performs the operation of processing 2 in the next step, or Step S4, as shown in FIG. 4.

The operation of processing 2 in Step S4 is that of judging if the vehicle may not divert from the route of movement if it follows the branch road 27a according to the flow chart of FIG. 6. Referring to FIG. 6, the agreement judging section 23 collates the acquired road information and still another requirement in the requirement information. For instance, it may determine if the width or the number of lanes of the current road 25 differs from the width or the number of lanes, whichever appropriate, of the branch road 27a on the route of movement (Step S51).

If it is determined in Step S51 that the width or the number of lanes of the current road 25 does not differ from the width or the number of lanes, whichever appropriate, of the branch road 27a, the agreement judging section 23 judges that possibly the vehicle may not divert from the route of movement if it takes the branch road 27a. Therefore, the agreement judging section 23 collates the acquired road information and still another requirement in the requirement information. For instance, it may determine if the width or the number of lanes of the current road 25 is the same as the width or the number of lanes, whichever appropriate, of the branch road 27b that is not on the route of movement or not (Step S52).

If, on the other hand, it is determined in Step S51 that the width or the number of lanes of the current road 25 differs from the width or the number of lanes, whichever appropriate, of the branch road 27a, the agreement judging section 23 judges that possibly the vehicle may divert from the route of movement if it takes the branch road 27a. Therefore, the agreement judging section 23 subtracts the number of points P21 correlated with the requirement from the total number of points P (Step S53) and the system control section 10 proceeds to Step S52.

If it is determined in Step S52 that the width or the number of lanes of the current road 25 is not the same as the width or the number of lanes, whichever appropriate, of the branch road 27b, the agreement judging section 23 judges that the branch road 27b is a byroad. Therefore, the agreement judging section 23 judges that possibly the vehicle may not divert from the route of movement if it takes the branch road 27a and the system control section 10 ends the operation of processing 2.

If, on the other hand, it is determined in Step S52 that the width or the number of lanes of the current road 25 is the same as the width or the number of lanes, whichever appropriate, of the branch road 27b, the agreement judging section 23 judges that possibly the vehicle may not divert from the route of movement if it takes the branch road 27b. Thus, the agreement judging section 23 judges that possibly the vehicle may divert from the route of movement if it takes the branch road 27a and subtracts the number of points P22 correlated with the requirement from the total number of points P (Step S54) and the system control section 10 ends the operation of processing 2.

After ending the operation of processing 2, the agreement judging section 23 performs the operation of processing 3 in the next step, or Step S5, as shown in FIG. 5.

The operation of processing 3 in Step S5 is that of judging if the vehicle may not divert from the route of movement if it follows the branch road 27a according to the flow chart of FIG. 7. Referring to FIG. 7, the agreement judging section 23 collates the acquired road information and still another requirement in the requirement information. For instance, it may determine if the fork 26 has a traffic light 28 or not (Step S61).

If it is determined in Step S61 that the fork 26 has a traffic light 28, the agreement judging section 23 judges that possibly the vehicle may divert from the route of movement if it takes the branch road 27a. Thus, the agreement judging section 23 subtracts the number of points P31 correlated with the requirement from the total number of points P (Step S62) and the system control section 10 ends the operation of processing 3.

If, on the other hand, it is determined in Step S61 that the fork 26 does not have a traffic light 28, the agreement judging section 23 judges that possibly the vehicle may not divert from the route of movement if it takes the branch road 27a. Thus, the agreement judging section 23 adds the number of points P32 correlated with the requirement from the total number of points P (Step S63) and the system control section 10 ends the operation of processing 3.

In this way, the agreement judging section 23 controls the notification of guidance relating to the movement of the vehicle by collating the acquired road information and a requirement in the requirement information at a time and judges if the vehicle may or may not divert from the route of movement if it takes the branch road 27a on the route of movement depending on if the obtained total number of points P is greater than the point threshold value Patd or not. Therefore, the navigation apparatus 1 recognizes the road condition of the road located ahead of the vehicle in the running direction thereof so that it can appropriately provide a notification of guidance relating to the movement of the vehicle, taking the road condition into consideration, and avoid the embarrassment on the part of the fellow passengers of the vehicle due to unnecessary guidance. Thus, the moving vehicle can continue its movement under an appropriate guidance.

The guidance notification control section 19 controls the notification of the guidance notification section 18 on the basis of agreement of the characteristics of the current road 25, those of each of the branch roads 27a, 27b including the contour of road by comparing the road information on the current road 25 on which the vehicle on the route of movement is running, the road information on the branch road 27a that is extending from the fork 26 located ahead of the vehicle running on the current road 25 as viewed in the running direction thereof and found on the route of movement and the road information of the branch road 27b that is also extending from the fork 26 located ahead of the vehicle running on the current road 25 as viewed in the running direction thereof and not found on the route of movement. Thus, the notification of guidance is restricted or suppressed depending on the degree of agreement of the characteristics of the current road 25 on which the vehicle is running and those of each of the branch roads 27a, 27b branching from the fork 26 located ahead of the vehicle. Therefore, if the characteristics of the current road 25 and those of the branch road 27a agree to a large extent, it may be so judged that the vehicle may not divert from the route of movement if no guidance is provided and then the notification of guidance may be restricted or suppressed to avoid the embarrassment due to unnecessary guidance. The navigation apparatus 1 can make such a judgment by utilizing the road information of the map information that is used to define the route of movement. In other words, the navigation apparatus 1 does not require any additional information in order to avoid the embarrassment due to unnecessary guidance so that it can control the guidance with ease.

Agreement of characteristics is judged on a one by one basis. In other words, requirement information asking at least the number of lanes, existence or non-existence of a median strip, the width of the road or existence or non-existence of a traffic light is used at a time in order to judge agreement. Thus, the judgment for controlling guidance can be made efficiently with ease by using the ordinary items of road information.

Particularly, the characteristics of the current road heading for a fork 26 and those of each of the roads extending from the fork 26 are collated with the requirement information to judge if the vehicle may or may not divert from the route of movement, so that it can be judged reliably and easily if the vehicle may not divert from the route of movement without any guidance.

The above judgment on the degree of agreement is made by collating the acquired road information with each of a number of requirements contained in the requirement information and the degree of agreement is expressed by points, which is compared with a predetermined point threshold value Patd. With this arrangement, the judgment if the vehicle may not divert from the route of movement without any guidance can be made reliably so that the notification of guidance can be controlled very reliably.

[Modifications of the Embodiment]

The present invention is by no means limited to the above described embodiment, which may be modified and altered in various different ways without departing from the scope of the present invention.

While the embodiment is installed in a vehicle to support the movement of the vehicle by providing a notification of guidance relating to the movement of the vehicle in the above description, the moving vehicle is not limited to a motor vehicle and the embodiment may be used for a train or a toy that is moving on a road.

While road information is described above in terms of links L and nodes N, any information that can be utilized to recognize characteristics of roads may be used for the purpose of the invention. For example, road information may contain information on nodes N and the directions of the roads extending from the each of the nodes N.

While the extent of agreement is judged on the basis of points in the above description, the judgment if the vehicle may not divert from the route of movement or not can be made on the basis of the number of requirements that are found to be satisfied as a result of collation without using points.

While a number of requirements are used for the purpose of collation in the above description, agreement of characteristics may be judged by using a single requirement, although the use of a number of requirements for the purpose of collation can improve the reliability of judgment and hence guidance and notification of guidance can be controlled more reliably.

The requirements contained in requirement information are not limited to those described above for the embodiment and other requirements relating to characteristics of roads may additionally or alternatively be used.

The specific configuration and the specific procedure of carrying out the present invention can be modified appropriately without departing from the scope of the present invention.

What is claimed is:

1. A navigation apparatus comprising:

a current location recognizing section for recognizing the current location of a moving vehicle;

a destination recognizing section for recognizing the destination of the moving vehicle;

a map information storage section for storing map information including road information relating to the locations of forks and the road to be followed by the moving vehicle from each fork to the next;

a route of movement defining section for defining the route of movement to be followed by the moving vehicle from the current location recognized by the current location recognizing section to the destination recognized by the destination recognizing section on the basis of the road information in said map information;

a guidance notification section for notifying guidance relating to the movement of the moving vehicle on the basis of the route of movement to be followed as defined by said route of movement defining section and the current location recognized by said current location recognizing section; and a guidance notification control section for controlling the notification by said guidance notification section on the basis of the current road bearing the moving vehicle on said route of movement, the road continuing from the fork located immediately ahead of said moving vehicle in the moving direction of the vehicle, road information relating to the roads from said fork other than the one continuing on said route of movement, and a predetermined number of correlations among the characteristics of the roads.

2. The apparatus according to claim 1, wherein the guidance notification control section controls the notification of the guidance notification section by comparing road information relating to the current road bearing the moving vehicle on the route of movement, road information relating to the road continuing from the fork located immediately ahead of said moving vehicle in the moving direction of the vehicle and said road information relating to the roads other than the one continuing from said fork on said route of movement and according to the agreement of the characteristics of the current road and the characteristics of the road continuing from the fork.

3. The apparatus according to claim 2, wherein the guidance notification control section uses at least the number of car lanes, the presence or absence of a median strip, the width of the road, the presence or absence of a traffic light as said characteristics when judging the agreement of two sets of said characteristics.

4. The apparatus according to claim 2, further comprising:

a requirement information storage section for storing information relating to the predetermined requirements to be commonly met by the relationship between the characteristics of a road extending beyond a fork and the characteristics of a road heading for the fork;

the guidance notification control section being adapted to collate the relationship between the characteristics of each of the roads extending beyond the fork located ahead in the moving direction of the moving vehicle and the characteristics of the current road bearing the moving vehicle with the predetermined requirements to be commonly met by the characteristics of the road extending beyond the fork and the characteristics of the road heading for the fork stored in the requirement information storage section and judge the agreement of any of the sets of characteristics of the roads extending beyond the fork and the set of characteristics of the current road.

5. The apparatus according to claim 4, wherein the guidance notification control section judges agreement of the characteristics of a road and the characteristics of another road on the basis of the number of requirements that are commonly met by the roads.

6. The apparatus according to claim 4, wherein the guidance notification control section judges agreement of the characteristics of a road and the characteristics of another road on the basis of the total number of points given to the requirements that are commonly met by the roads.

7. The apparatus according to claim 2, wherein the guidance notification control section restricts or suppresses the notification by the guidance notification section when the degree of agreement of the characteristics of the current road bearing the moving vehicle on the route of movement and the characteristics of the road continuing from the fork located immediately ahead of said moving vehicle in the moving direction of the vehicle exceeds the degree of agreement of the characteristics of the current road bearing the moving vehicle on the route of movement and the characteristics of any other roads other than the one continuing from the fork on the route of movement.

8. A navigation method for supporting the movement of a moving vehicle by a computing section, said method comprising:

recognizing the current location of the moving vehicle and the destination of said moving vehicle;

defining the route of movement to be followed by said moving vehicle from the recognized current location to the recognized destination on the basis of map information including road information relating to the locations of forks and the road to be followed by said moving vehicle from each fork to the next; and notifying guidance relating to the movement of said moving vehicle on the basis of information relating to the current road bearing said moving vehicle in the defined route of movement, the road continuing from the fork located immediately ahead of said moving vehicle in the moving direction of the vehicle and the roads from said fork other than the one continuing on said route of movement, and a predetermined number of correlations among the characteristics of the roads.

9. The method according to claim 8, wherein road information relating to the current road bearing the moving vehicle on the route of movement, road information relating to the road continuing from the fork located immediately ahead of said moving vehicle in the moving direction of said moving vehicle and road information relating to the roads other than the one continuing from said fork on said route of movement are compared by a computing section so as to notify guidance relating to the movement of the moving vehicle according to the agreement of the characteristics of the current road and the characteristics of the road continuing from the fork.

10. The method according to claim 9, wherein at least the number of car lanes, the presence or absence of a median strip, the width of the road, the presence or absence of a traffic light is used as the characteristics by the computing section.

11. The method according to claim 9, wherein the relationship between the characteristics of each of the roads extending beyond the fork located ahead in the moving direction of the moving vehicle and the characteristics of the current road bearing the moving vehicle is collated with the predetermined requirements to be commonly met by the characteristics of a road extending beyond a fork and the characteristics of a road heading for the fork stored in a requirement information storage section and said agreement is judged on the extent of satisfaction of the requirements as evidenced by the collation by the computing section.

12. The method according to claim 11, wherein said agreement is judged on the basis of the number of requirements that are commonly met by the roads by the computing section.

13. The method according to claim 11, wherein said agreement is judged on the basis of the total number of points given to the requirements that are commonly met by the roads by the computing section.

14. The method according to claim 9, wherein the guidance relating to the movement of the moving vehicle is restricted or suppressed by the computing section when the degree of agreement of the characteristics of the current road bearing the moving vehicle on the route of movement and the characteristics of the road continuing from the fork located immediately ahead of said moving vehicle in the moving direction of the vehicle exceeds the degree of agreement of the characteristics of the current road bearing the moving vehicle on the route of movement and the characteristics of any other roads other than the one continuing from the fork on the route of movement.

15. A navigation program that causes said computer section to execute said navigation method according to claim 8.

16. A recording medium that stores said navigation program according to claim 15 so as to be computer-readable.

* * * * *